UNITED STATES PATENT OFFICE.

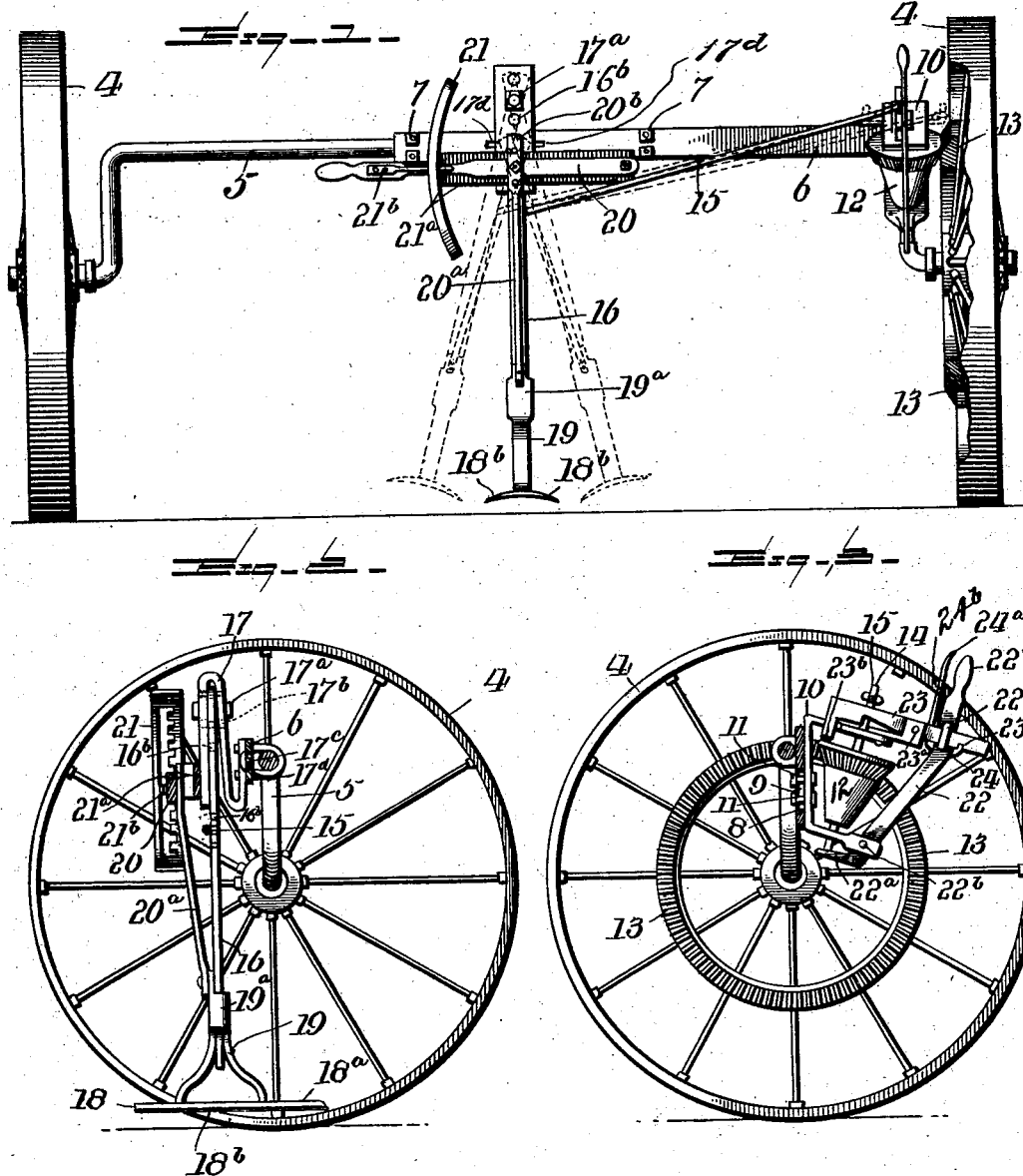

JOHN T. JAMES, OF ALTUS, OKLAHOMA TERRITORY.

COTTON-CHOPPER.

SPECIFICATION forming part of Letters Patent No. 694,479, dated March 4, 1902.

Application filed June 11, 1901. Serial No. 64,086. (No model.)

*To all whom it may concern:*

Be it known that I, JOHN T. JAMES, a citizen of the United States, residing at Altus, in the county of Greer and Territory of Oklahoma, have invented certain new and useful Improvements in Cotton-Choppers; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a cotton-chopper attachment adapted to be applied to any wheel-cultivator of the more usual or preferred construction.

The invention contemplates the provision of a chopper with means capable of ready attachment to the axle of a cultivator or detachment therefrom and in means for coupling up said chopper with the wheels or operating mechanism of the cultivator, so as to transmit the requisite movement of the chopper.

The invention also embraces the idea of providing a chopper with an improved mechanism whereby the operating means of the chopper may be readily thrown in or out of gear with the wheels of the cultivator, so as to start or stop the movement of the chopper.

The invention also embraces the idea of providing a chopper with an improved adjusting mechanism whereby the elevation thereof may be secured without interfering with the continuous operation thereof.

The novel details in the construction and arrangement of the several parts of the machine will be apparent from the detailed description hereinafter and the appended claims when read in connection with the illustration in the accompanying drawings.

In said drawings one embodiment of the invention is shown for the sake of clearness and understanding the invention, and when hereinafter referring to the same like reference characters will refer to corresponding parts in the several views, and Figure 1 is an elevation of the attachment as applied to the axle of a cultivator. Fig. 2 is a section on the line $xx$ of Fig. 1 looking toward the left. Fig. 3 is a corresponding section looking toward the right.

Referring more specifically to the drawings, 4 designates the ordinary conveying-wheels of a cultivator, and 5 the axle thereof, being, preferably, of the arched type shown.

6 is an elongated supporting-bar adapted to lie upon the surface of the axle 5 and be secured in position thereon by clamps or bolts 7. At one end of this supporting-bar is a depending member 8, provided with an elongated slot 9, in which a bracket 10 is secured through the medium of a bolt and nut 11, by which a vertical adjustment of the bracket is afforded. In the bracket a pinion 12 is rotatively mounted, so that it may be brought in mesh with the teeth of a relatively large bevel-gear 13, secured to the spokes of the cultivator-wheel. The upper end of the axle of the pinion 12 extends through the bracket upwardly and is formed into a crank 14, which is secured to a pitman 15, which is designed to transmit motion from said crank and pinion to the supporting-bar 16. In the upper end of this supporting-bar is formed a series of apertures $16^b$ to provide for the adjustment in which the ends of the pitman may engage and a proper adjustment thereof effected. This supporting-bar is in turn connected to a pin $17^a$, engaging in suitable apertures $17^b$ in an inverted-V-shaped bracket 17, secured to the supporting member 6. This bracket is capable of a longitudinal adjustment by means of a bolt and nut $17^c$ working in the slot $17^d$ in said supporting member 6.

The chopper blade or knife is indicated at 18, and comprises a pointed end $18^a$ and cutting edges $18^b$, the latter being slightly curved downwardly at their edges, as shown. The blade is carried by the arms 19, projecting from the ends thereof upwardly to the sleeve $19^a$, adapted to slidably engage the main supporting-bar 16. The purpose of slidably mounting the sleeve upon the supporting-rod is to provide for a slight adjustment in the elevation of the cutting-blade without interrupting the continued vibratory movement thereof. The sleeve is connected to a pivoted operating-lever 20 through the medium of the connecting-rod $20^a$, adjustable at its upper ends, as at $20^b$, and the lever is held in its adjusted position by the rack 21, carried by the bracket 21ª, the lever being confined at different points of the rack by the spring 21ᵇ.

The mechanism by which the pinion may be engaged or disengaged with the driving-gear will now be described. The space between the upper and lower arms of the bracket 10 is greater than the width of the pinion 12, which is capable of movement between the arms. The lower end of the axle of the pinion 12 extends loosely through and below the lower arm of the bracket 10 and rests upon the foot 22ª of an upright bent lever 22, which is adjustably pivoted at 22ᵇ to the lower arm of the bracket and extends upwardly to its handle 22ᶜ in convenient reach of the operator. Extending through a bracket 22ᵈ on the lever 22 is one end of a horizontal cross bar or lever 23, pivoted to the upper arm of the bracket 10 by a pin 23ª and having at its other end a downwardly-extending head 23ᵇ, which may be provided with any suitable anti-friction device and is adapted to bear upon the back of the pinion 12. A latch 24 is pivoted to the upright lever in position to engage a notch 23ᶜ in the horizontal bar when the upright lever is thrown forward. The latch is provided with usual lever-handle 24ª and a spring 24ᵇ to cause it to engage the notch. The arrangement is such that when the lever 22 is thrown forward the outer end of the cross-lever 23 is raised by the bracket 22ᵈ, causing the head 23ᵇ to bear upon the pinion and force its teeth into engagement with those of the bevel-gear, in which position it will be normally held by engagement of the latch 24 in the notch 23ᶜ. When it is desired to disengage the pinion, the latch is released and the lever 22 is thrown back by the operator, and the foot of the lever engages the lower end of the axle of the pinion and lifts the same out of engagement with the gear-wheel. It will be seen that by the means described the vibration of the knife can be stopped at any time without stopping the cultivator.

The further operation may now be understood fully. The levers being adjusted to mesh the pinion with the bevel-gear 13, a rotary motion will be imparted to the pinion, which in turn through the medium of its crank and connecting-rod will give a vibratory movement to the blade-supporting rod. Should it be found desirable to raise or lower the blade to accommodate various elevations of the ground, such adjustment may be effected without in the least interrupting the operation of the blade by simply raising and lowering the lever 20 and engaging the same with the teeth of the rack 21.

Having thus described the invention, what is claimed as new, and desired to be secured by Letters Patent, is—

1. In combination with a cultivator or the like, a cotton-chopper attachment detachably connected to the axle thereof, comprising a blade, a vertically-adjustable rod for supporting the blade, a laterally-adjustable bracket in which the rod is mounted, and means for vibrating the blade comprising instrumentalities operated from the conveying-wheels of the cultivator, substantially as described.

2. In combination with a cultivator or the like, of a cotton-chopper attachment adapted to be secured thereto, comprising a blade, means for operating said blade, and means for adjusting the elevation of the said blade without interrupting the operation thereof, comprising a rod connected to the blade and a lever adjustably connected to the rod, substantially as described.

3. In combination with a cultivator or the like, of a cotton-chopper attachment adapted to be secured thereto, comprising a blade, a vibratory supporting-bar therefor, means for operating the bar, and means for adjustably securing the blade upon said bar, substantially as described.

4. In combination with a cultivator, a cotton-chopper attachment adapted to be secured thereto, comprising a blade, a supporting-rod for said blade, a bracket carrying said supporting-rod, means for imparting a vibratory movement to said supporting-rod, an adjustable connection between the rod and its supporting-bracket and means permitting lateral adjustment to the bracket, substantially as described.

5. In combination with a cultivator, a cotton-chopper attachment adapted to be secured thereto, comprising a supporting member, a bracket on said member, a supporting-bar adjustably mounted in said bracket, means for imparting a vibratory movement to said supporting-bar, a rack on said bracket, a pivoted lever adapted to be adjusted in said rack, a rod connected to said lever, a sleeve at the end of said rod slidably mounted upon the supporting-rod, and a cutter suspended from said sleeve, substantially as shown and described.

6. In combination with a cultivator or the like, a cotton-chopper attachment comprising supporting means, a blade carried thereby, means to vibrate the blade comprising a pitman, a pinion connected thereto adapted to engage a gear-wheel actuated by the conveying means of the cultivator, a lever adapted to disengage the pinion from the gear-wheel, and another lever having a head bearing against the back of the pinion and adapted to be actuated by the first-mentioned lever to retain the pinion in engagement with the gear-wheel.

In testimony whereof I affix my signature in presence of two witnesses.

JOHN T. JAMES.

Witnesses:
J. J. SATTERFIELD,
W. H. GATES.